United States Patent
Beppu et al.

(10) Patent No.: US 7,994,090 B2
(45) Date of Patent: Aug. 9, 2011

(54) PROCESS FOR PRODUCING FINE PARTICLES OF SOLID SOLUTION

(75) Inventors: Yoshihisa Beppu, Chiyoda-ku (JP); Kazuo Sunahara, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/506,415

(22) Filed: Jul. 21, 2009

(65) Prior Publication Data

US 2010/0022387 A1    Jan. 28, 2010

Related U.S. Application Data

(63) Continuation of application No. PCT/JP2008/051565, filed on Jan. 31, 2008.

(30) Foreign Application Priority Data

Feb. 2, 2007 (JP) ................................. 2007-024419

(51) Int. Cl.
*B01J 23/10* (2006.01)
*B01J 21/02* (2006.01)

(52) U.S. Cl. ......... 502/302; 502/303; 502/304; 502/202

(58) Field of Classification Search .................. 502/302, 502/303, 304, 202
See application file for complete search history.

(56) References Cited

U.S. PATENT DOCUMENTS

| 4,565,792 A | 1/1986 | Knapp |
| 7,381,232 B2 * | 6/2008 | Beppu et al. ................... 51/309 |

FOREIGN PATENT DOCUMENTS

| JP | 60-065726 | 4/1985 |
| JP | 01-239038 | 9/1989 |
| JP | 11-292538 | 10/1999 |
| JP | 11-292539 | 10/1999 |
| JP | 2000-319019 | 11/2000 |
| JP | 2004-331492 | 11/2004 |
| JP | 2007-326735 | 12/2007 |
| WO | 2009-075022 | 6/2009 |

OTHER PUBLICATIONS

U.S. Appl. No. 12/796,492, filed Jun. 8, 2010, Beppu, et al.

\* cited by examiner

*Primary Examiner* — Elizabeth D Wood
(74) *Attorney, Agent, or Firm* — Oblon, Spivak, McClelland, Maier & Neustadt, L.L.P.

(57) ABSTRACT

Provided is a process for readily producing fine particles of a solid solution having a small particle size, comprising a solid solution of zirconia, ceria and a rare earth oxide in a desired composition, and being highly crystalline.

The process for producing the fine particles of the solid solution comprises the following steps in the order named: obtaining a melt comprising, in terms of mol % on an oxide basis, from 5 to 50% $ZrO_2$, $CeO_2$ and $RE_2O_3$ (where RE is at least one member selected from rare earth elements other than Ce) in total, from 10 to 50% RO (where R is at least one member selected from the group consisting of Mg, Ca, Sr, Ba and Zn), and from 30 to 75% $B_2O_3$; quenching the melt to obtain an amorphous material; heating the amorphous material to obtain precipitates containing crystals of a solid solution with $ZrO_2$, $CeO_2$ and $RE_2O_3$; and separating the crystals of the solid solution from the precipitates to obtain fine particles of the solid solution.

17 Claims, No Drawings

PROCESS FOR PRODUCING FINE PARTICLES OF SOLID SOLUTION

TECHNICAL FIELD

The present invention relates to a process for producing fine particles of a solid solution of zirconia ($ZrO_2$), ceria ($CeO_2$) and a rare earth oxide other than ceria.

BACKGROUND ART

It has been known heretofore that ceria-based oxides are used as a co-catalyst of a three-way catalyst for treatment of exhaust gas discharged from automobiles. Here, the three-way catalyst is a catalyst having a function to remove carbon monoxide, hydrocarbons and nitrogen oxides from the exhaust gas generated with combustion of an internal combustion engine.

In view of recent tendencies toward higher performance and high-temperature use of the catalyst, there is a demand to develop a catalyst that has a high specific surface area and high heat resistance enough to resist decrease in the specific surface area even at high temperatures.

A solid solution comprising ceria, zirconium and an oxide of a rare earth element (lanthanum or the like) other than cerium is recently proposed as one of materials showing such properties (e.g., cf. Claim 6 and examples in Patent Document 1, Claim 2 and examples in Patent Document 2, and Claim 2 and examples in Patent Document 3).

A usually used process for producing such a solid solution is a solution method such as a coprecipitation method. Production of the solid solution by the coprecipitation method is normally so conducted that a solution containing cerium ions, zirconium ions and rare earth ions is prepared, a pH of the solution is controlled to obtain precipitates (coprecipitates) containing cerium, zirconium and the rare earth element, and the coprecipitates are subjected to a heat treatment to convert to oxides.

Patent Document 1: JP-A-2000-319019
Patent Document 2: JP-A-11-292538
Patent Document 3: JP-A-11-292539

DISCLOSURE OF THE INVENTION

Object to be Accomplished by the Invention

In the above coprecipitation method, it is difficult to obtain the coprecipitates containing cerium, zirconium and the rare earth element in a desired composition because constituent elements of the starting materials precipitate at respective different pHs. Therefore, for sufficient progress of the solid solution formation, complicated operations are essential in selection of an additive, control of reaction conditions, and so on. Furthermore, the heat treatment of the coprecipitates is essential and a resulting product grows into grains by heat; therefore, it is not easy to obtain the solid solution in the form of fine particles (e.g., fine particles with an average primary particle size of al most 200 nm). In addition, the crystallinity of the fine particles is low.

The present invention relates to a process for producing fine particles of a solid solution of zirconia, ceria and a rare earth oxide other than ceria, and an object of the present invention is to provide a process for readily producing fine particles of a solid solution having a small particle size, comprising a solid solution of zirconia, ceria and a rare earth oxide in a desired composition, and being highly crystalline.

Means to Accomplish the Object

In order to accomplish the above-mentioned object, the present invention adopts the following aspects.

[1] A process for producing fine particles of a solid solution, comprising the following steps in the order named:
obtaining a melt comprising, in terms of mol % on an oxide basis, from 5 to 50% $ZrO_2$, $CeO_2$ and $RE_2O_3$ (where RE is at least one member selected from rare earth elements other than Ce) in total, from 10 to 50% RO (where R is at least one member selected from the group consisting of Mg, Ca, Sr, Ba and Zn), and from 30 to 75% $B_2O_3$;
quenching the melt to obtain an amorphous material;
heating the amorphous material to obtain precipitates containing crystals of a solid solution with $ZrO_2$, $CeO_2$ and $RE_2O$; and
separating the crystals of the solid solution from the precipitates to obtain fine particles of the solid solution.

[2] The process for producing the fine particles of the solid solution according to the above aspect [1], wherein a content of $ZrO_2$ in the melt is from 3 to 95 mol % to the total of $ZrO_2$, $CeO_2$ and $RE_2O_3$.

[3] The process for producing the fine particles of the solid solution according to the above aspect [1] or [2], wherein a content of $CeO_2$ in the melt is from 3 to 95 mol % to the total of $ZrO_2$, $CeO_2$ and $RE_2O_3$.

[4] The process for producing the fine particles of the solid solution according to any one of the above aspects [1] to [3], wherein a content of $RE_2O_3$ in the melt is from 0.5 to 45 mol % to the total of 20 $ZrO_2$, $CeO_2$ and $RE_2O_3$.

[5] The process for producing the fine particles of the solid solution according to any one of the above aspects [1] to [4], wherein a content of RO in the melt is from 10 to 60 mol % to the total of RO and $B_2O_3$.

[6] The process for producing the fine particles of the solid solution according to any one of the above aspects [1] to [5], wherein the amorphous material is of a flake form or a fiber form.

[7] The process for producing the fine particles of the solid solution according to any one of the above aspects [1] to [6], wherein the amorphous material is heated at a temperature of from 600 to 900° C.

[8] The process for producing the fine particles of the solid solution according to any one of the above aspects [1] to [7], wherein the crystals of the solid solution are separated by adding an acid into the precipitates.

[9] The process for producing the fine particles of the solid solution according to any one of the above aspects [1] to [8], wherein a content of $ZrO_2$ in a chemical composition of the fine particles of the solid solution is from 3 to 97 mol % to the total of $ZrO_2$, $CeO_2$ and $RE_2O_3$.

[10] The process for producing the fine particles of the solid solution according to any one of the above aspects [1] to [9], wherein a content of $CeO_2$ in a chemical composition of the fine particles of the solid solution is from 3 to 97 mol % to the total of $ZrO_2$, $CeO_2$ and $RE_2O_3$.

[11] The process for producing the fine particles of the solid solution according to any one of the above aspects [1] to [10], wherein a content of $RE_2O_3$ in a chemical composition of the fine particles of the solid solution is from 0.1 to 15 mol % to the total of $ZrO_2$, $CeO_2$ and $RE_2O_3$.

[12] The process for producing the fine particles of the solid solution according to any one of the above aspects [1] to [11], wherein an average primary particle size of the fine particles of the solid solution is from 5 to 200 nm.

[13] The process for producing the fine particles of the solid solution according to any one of the above aspects [1] to

[12], wherein a specific surface area of the fine particles of the solid solution is at least 20 m²/g.

Effects of the Invention

According to the present invention, it is feasible to readily produce the fine particles of the solid solution having the small particle size, comprising the solid solution of zirconia, ceria and the rare earth oxide in the desired composition, and being highly crystalline. The fine particles have the small particle size and high specific surface area. Furthermore, the fine particles also have excellent heat resistance and show insignificant change in the particle size and specific surface area even in high-temperature use. Therefore, the fine particles can be used over a long period of time as an oxidation-reduction catalyst, as a co-catalyst of a three-way catalyst for treatment of exhaust gas discharged from automobiles, and as a material for fuel cells.

BEST MODE FOR CARRYING OUT THE INVENTION

The production process of the present invention comprises the following steps in the order named: obtaining a melt in a predetermined composition (hereinafter referred to as a "melting step"); quenching the melt to obtain an amorphous material (hereinafter referred to as a "quenching step"); heating the amorphous material to obtain precipitates containing crystals of a solid solution with $ZrO_2$, $CeO_2$ and $RE_2O_3$ (where RE is at least one member selected from the rare earth elements other than Ce) (hereinafter also referred to as a "Zr—Ce—RE oxide solid solution") (hereinafter referred to as a "crystallizing step"); and separating the crystals of the solid solution from the precipitates to obtain the fine particles of the solid solution (hereinafter referred to as an "separating step").

[Melting Step]

The melting step is to obtain the melt comprising, in terms of mol % on an oxide basis, from 5 to 50% $ZrO_2$, $CeO_2$ and $RE_2O_3$ in total, from 10 to 50% RO (where R is at least one member selected from the group consisting of Mg, Ca, Sr, Ba and Zn) and from 30 to 75% $B_2O_3$.

The melt in the above composition range is preferable because it has an adequate viscosity and undergoes vitrification without crystallization of the melt to provide the amorphous material in the subsequent quenching step.

If the total content of $ZrO_2$, $CeO_2$ and $RE_2O_3$ in the melt exceeds 50% (in terms of mol % on an oxide basis), if the content of RO is less than 10%, or if the content of $B_2O_3$ is less than 30%, the melting becomes insufficient or the melt is likely to crystallize in the quenching step, whereby it is difficult to obtain the amorphous material by vitrification. As a result, it is difficult to obtain the fine particles of the Zr—Ce—RE oxide solid solution in the desired composition, which is not preferable.

If the total content of $ZrO_2$, $CeO_2$ and $RE_2O_3$ in the melt is less than 5% (in terms of mol % on an oxide basis), if RO exceeds 50%, or if $B_2O_3$ exceeds 75%, the crystals of the Zr—Ce—RE oxide solid solution might not sufficiently precipitate in the subsequent crystallizing step, which is not preferable.

It is noted that mol % on an oxide basis means, unless otherwise specified, a mole percentage based on a molecule in which an oxidation number of a metal oxide becomes maximum, and calculated from a charged amount of a raw material. Namely, an amount of each element (Zr, Ce, RE, R, or B) derived from each raw material is calculated from a charged amount of the raw material; the amount of each element is converted to an amount of an oxide thereof ($CeO_2$, $ZrO_2$, $RE_2O_3$, RO or $B_2O_3$) with the maximum oxidation number of the element; and a content of each oxide to the total amount (mol %) is calculated, thereby obtaining mol % on an oxide basis.

In the melt, the total content of $ZrO_2$, $CeO_2$ and $RE_2O_3$ is preferably from 10 to 50%, more preferably from 20 to 40% in mol %.

In the melt, the content of RO is preferably from 10 to 45%, more preferably from 10 to 40% in 45 mol %.

In the melt, the content of $B_2O_3$ is preferably from 30 to 60%, more preferably from 40 to 60% in mol %.

When the total content of $ZrO_2$, $CeO_2$ and $RE_2O_3$, and the contents of RO and $B_2O_3$ are within the above respective ranges, it is easy to obtain the fine particles of the Zr—Ce—RE oxide solid solution in the desired composition and a yield thereof can be increased, which is preferable.

In the melt, the content of $ZrO_2$ is preferably from 3 to 95 mol %, more preferably from 3 to 80 mol %, still more preferably from 3 to 70 mol % to the total of $ZrO_2$, $CeO_2$ and $RE_2O_3$. When the melt contains $ZrO_2$ at the above content, it is easy to obtain the fine particles of the Zr—Ce—RE oxide solid solution in the desired composition.

In the melt, the content of $CeO_2$ is preferably from 3 to 95 mol %, more preferably from 5 to 95 mmol %, still more preferably from 10 to 80 mol % to the total of $ZrO_2$, $CeO_2$ and $RE_2O_3$. When the melt contains $CeO_2$ at the above content, it is easy to obtain the fine particles of the Zr—Ce—RE oxide solid solution in the desired composition. Furthermore, the melt has an adequate viscosity and is likely to undergo vitrification without crystallization of the melt to readily provide the amorphous material in the subsequent quenching step.

In the melt, the content of $RE_2O_3$ is preferably from 0.5 to 45 mol %, more preferably from 0.5 to 35 mol % to the total of $ZrO_2$, $CeO_2$ and $RE_2O_3$. When the melt contains $RE_2O_3$ at the above content, it is easy to obtain the fine particles of the Zr—Ce—RE oxide solid solution in the desired composition.

The content of RO in the melt is preferably from 10 to 60 mol %, more preferably from 10 to 50 mol %, still more preferably from 15 to 50 mol % to the total of RO and $B_2O_3$. When the melt contains RO at the above content, the melt is likely to undergo vitrification and it is easy to obtain the fine particles of the Zr—Ce—RE oxide solid solution.

In the present invention, the contents of $ZrO_2$, $CeO_2$, $RE_2O_3$, RO and $B_2O_3$ in the melt are preferably from 5 to 30%, from 5 to 40%, from 0.1 to 40%, from 10 to 40% and from 40 to 60%, respectively in mol %.

By adopting the above composition, it is easy to obtain the melt with an adequate viscosity and to obtain the fine particles of the Zr—Ce—RE oxide solid solution in the desired composition. Furthermore, the yield of the fine particles of the Zr—Ce—RE oxide solid solution can be raised relative to the melted raw material. In addition, it is likely that fine particles with small particle sizes are obtained.

The melt can be obtained by using, as raw materials, a compound as a Zr source, a compound as a Ce source, a compound as an RE source, a compound as an R source and a compound as a B source, mixing these raw materials at a predetermined ratio so that a resulting melt has a composition within the above composition range, and heating the mixture in the presence of oxygen.

The composition of this mixture theoretically corresponds, in principle, to the composition of the melt obtained from this mixture. However, there is a component easily lost by volatilization during the melting treatment, e.g., B or the like in the mixture, and the composition of the resulting melt might be slightly different from the composition in terms of mol % on an oxide basis calculated from charging amounts of the respective raw materials.

The Zr source is preferably at least one member selected from the group consisting of zirconium oxide ($ZrO_2$), zirconium hydroxide ($Zr(OH)_4$) and ceria, magnesia and calcia-stabilized zirconia ($((Ce,Ca,Mg)_xZr_{1-x}O_2$ where $0<x\geqq0.2$). The Zr source to be used may also be at least one member selected from the group consisting of zirconium carbonate ($Zr(CO_3)_2.nH_2O$), zirconium chloride ($ZrCl_4.nH_2O$), zirconium nitrate ($Zr(NO_3)_3.nH_2O$), zirconium sulfate ($Zr_2(SO_4)_3.nH_2O$) and zirconium fluoride ($ZrF_4$). (In the above formulae, n is a hydration number and is normally an integer of from 1 to 8 and a case of n=0, i.e., an anhydride is also included. Furthermore, their respective oxysalts are also included.)

The Ce source is preferably at least one member selected from the group consisting of cerium oxides ($CeO_2$, $Ce_2O_3$) and cerium carbonate ($Ce_2(CO_3)_3.nH_2O$). In addition, the Ce source to be used may also be at last one member selected from the group consisting of cerium hydroxide ($Ce(OH)_3.nH_2O$), cerium chloride ($CeCl_3.nH_2O$), cerium nitrate ($Ce(NO_3)_3.nH_2O$), cerium sulfate ($Ce_2(SO_4)_3.nH_2O$), ammonium cerium(IV) nitrate ($Ce(NH_4)_2(NO_3)_6$) and cerium fluoride ($CeF_3$). (In the above formulae, n is a hydration number and is normally an integer of from 1 to 8, and a case of n=0, i.e., an anhydride is also included. Furthermore, their respective oxysalts are also included.)

RE is at least one member selected from rare earth elements other than Ce and the rare earth elements other than Ce refer to Sc, Y and the elements of lanthanoids (atomic numbers 57 to 71) i.e., La, Pr, Nd, Pm, Sm, Eu, Gd, Th, Dy, Ho, Er, Tm, Yb and Lu, other than Ce, which belong to the 3A group in the periodic table. Among others, RE is preferably at least one member selected from La, Pr, Nd, Y, Gd and Yb because they are readily available. Furthermore, RE is preferably at least one member selected from La, Pr, Nd and Y because they are elements with relatively small specific gravity and the specific surface area of fine particles becomes larger when the fine particles are prepared in the same amount of RE added.

The RE source is preferably an oxide of each of the above rare earth elements (e.g., $RE_2O_3$). Moreover, the RE source to be used may also be at least one member selected from the group consisting of a carbonate (e.g., $RE_2(CO_3)_2.nH_2O$), a chloride ($RECl_3.nH_2O$), a nitrate ($RE(NO_3)_3.nH_2O$), a sulfate ($RE(SO_4)_2.nH_2O$) and a fluoride ($REF_3$) of each of the above rare earth elements. (In the above formulae, n is a hydration number and is normally an integer of from 1 to 8, and a case of n=0, i.e., an anhydride is also included. Furthermore, their respective oxysalts are also included.)

The above Zr source, Ce source and RE source constitute the final product and, when melted, they also serve as part of glass-forming elements in cooperation with the R source and the B source described below.

R is at least one member selected from the group consisting of Mg, Ca, Sr, Ba and Zn.

The R source to be used is preferably at least one member selected from the group consisting of an oxide of R (RO) and a carbonate of R ($RCO_3$). In addition, the R source to be used may also be at least one member selected from the group consisting of a nitrate of R ($R(NO_3)_2$), a chloride of R ($RCl_2.nH_2O$), a sulfate of R ($RSO_4.nH_2O$) and a fluoride of R ($RF_2$). (In the above formulae, n is a hydration number and is normally an integer of from 1 to 8, and a case n=0, i.e., an anhydride is also included.)

In the present invention, ZnO is preferably included as part of RO. This can reduce the melting temperature and facilitate vitrification in the quenching step described below.

The B source is preferably at least one member selected from the group consisting of boron oxide ($B_2O_3$) and boric acid ($H_3BO_3$). Furthermore, it may be one of borates of Zr, Ce, RE and R.

There are no particular restrictions on the purity of the constituent materials in the mixture as long as the desired properties are not impaired. However, the purity excluding the hydration water is preferably at least 99%, more preferably at least 99.9%.

There are no particular restrictions on the particle sizes of the above constituent materials, either, as long as a uniform melt can be obtained when melted.

The above constituent materials are preferably mixed by mixing and pulverizing means such as a ball mill and a planetary mill in a dry method or a wet method before subjecting to the melting.

The melting step may be conducted in an atmospheric environment, but it is preferable to conduct the melting step under control of an oxygen partial pressure and an oxygen flow rate.

Furthermore, it is preferable to conduct the melting with a resistance heating furnace, a high frequency induction furnace or a plasma arc furnace. The resistance heating furnace is preferably an electric furnace equipped with a heating element of a metal such as Nichrome, silicon carbide, molybdenum silicide or a lanthanum chromite type. The high-frequency induction furnace may be one equipped with an induction coil and permitting control of output. The plasma arc furnace may be one with an electrode of carbon or the like and enabling use of plasma arc generated thereby. In addition, the melting may be conducted by infrared or laser direct heating.

The above mixture may be melted in the form of powder or the mixture preliminarily molded may be melted. When the plasma arc furnace is used, the mixture preliminarily molded may be melted as it is, and then quenched.

A crucible used for the melting is preferably one made of alumina, platinum, or platinum containing rhodium, but a refractory crucible can be also used.

The melting of the above mixture is preferably conducted at a temperature of at least 1,200° C., more preferably from 1,300 to 1,600° C.

Furthermore, the resulting melted glass material may be stirred in order to increase uniformity.

[Quenching Step]

In the quenching step, the melt obtained as above is rapidly cooled to around room temperature to obtain the amorphous material.

A quenching rate is preferably at least 100° C./sec, more preferably at least $1\times10^{4}$° C./sec.

In the quenching step, a method preferably applied is a method of dropping the melt between twin rollers rotating at a high speed, to obtain the amorphous material in the flake form, or a method of continuously taking up the amorphous material in the fiber form (long fiber) from the melt with use of a drum rotating at a high speed. The twin rollers and drum are preferably those made of metal or ceramics.

In addition, the amorphous material may be obtained in the fiber form (short fiber) by use of a spinner having pores in a side wall and rotating at a high speed. By using one of these apparatus, the melt is effectively quenched to obtain the amorphous material with a high purity.

In a case where the amorphous material is of the flake form, the melt is preferably quenched so that an average thickness of the amorphous material becomes at most 200 μm, more preferably at most 100 μm. Furthermore, in a case where the amorphous material is of the fiber form, the quenching step is preferably conducted so that an average diameter is at most 50 µm, more preferably at most 30 µm. By adjusting the average thickness or the average diameter to at most the above upper limit, a crystallization efficiency can be increased in the subsequent crystallizing step.

If the amorphous material is obtained with the thickness or diameter exceeding the above upper limit, the amorphous material is preferably subjected to pulverization and then supplied to the subsequent crystallizing step.

Here, the average thickness in the case of the flake form can be measured with a slide gauge or a micrometer. The average diameter in the case of the fiber form can be measured by the foregoing method or by observation with a microscope.

[Crystallizing Step]

In the crystallizing step, the amorphous material obtained in the quenching step is heated to obtain the precipitates containing crystals of the Zr.Ce.RE oxide solid solution.

The heating temperature in the crystallizing step is preferably from 600 to 900° C., more preferably from 650 to 850° C. If the heating temperature is less than 600° C., crystals are unlikely to precipitate even by continuous heating for about 24 hours. On the other hand, the heating temperature exceeding 900° C. is not preferable because the crystallized material containing the amorphous material might be melted.

A crystal-precipitating process consists of two steps of nucleation and crystal growth subsequent thereto, and thus the two steps can be conducted at different temperatures.

Furthermore, in the range of from 600 to 900° C., as the heating temperature is raised, a production amount and particle sizes of the precipitated crystals tend to become larger; therefore, the heating temperature is determined in accordance with the desired particle size.

Moreover, the heating temperature also affects the contents of $ZrO_2$, $CeO_2$ and $RE_2O_3$ to the total of $ZrO_2$, $CeO_2$ and $RE_2O_3$ in the chemical composition of the fine particles of the Zr.Ce.RE oxide solid solution finally obtained, and thus the heating temperature is preferably determined taking these into consideration.

In the crystallizing step, the heating temperature in the above range is preferably retained for from 4 hours to 96 hours because the Zr.Ce.RE oxide solid solution can be sufficiently crystallized. As the retention time (heating time) at the heating temperature is set longer, a production amount of the precipitated crystals is increased and the particle sizes of the precipitated crystals tend to become larger; therefore, the retention time is determined in accordance with the desired amount and particle sizes of the precipitated crystals.

Moreover, as in the case of the heating temperature described above, the heating time also affects the contents of $ZrO_2$, $CeO_2$ and $RE_2O_3$ to the total of $ZrO_2$, $CeO_2$ and $RE_2O_3$ in the chemical composition of the fine particles of the Zr.Ce.RE oxide solid solution finally obtained, and thus the heating time is preferably determined taking these into consideration.

In the crystallizing step, the amorphous material is crystallized to precipitate the fine particles of the Zr.Ce.RE oxide solid solution as crystals. At this point, depending on the composition of the mixture, a borate of R or double salts of $ZrO_2$, $CeO_2$, $RE_2O_3$, RO and boric acid might precipitate but those double salts can be removed in the subsequent separating step.

[Separating Step]

In the separating step, the crystals of the Zr.Ce.RE oxide solid solution are separated from the precipitates obtained in the crystallizing step, to obtain the fine particles of the Zr.Ce.RE oxide solid solution.

The separating step preferably includes a step of adding an acid into the precipitates. Substances other than the crystals of the Zr.Ce.RE oxide solid solution can be readily leached and removed by the addition of the acid into the precipitates.

The acid to be used can be an inorganic acid such as acetic acid, hydrochloric acid or nitric acid, or an organic acid such as oxalic acid or citric acid.

At this point, in order to promote the leaching treatment and to adjust the particle sizes of the fine particles within a desired range, the precipitates including the crystals of the Zr.Ce.RE oxide solid solution may be pulverized in a dry method or in a wet method before the leaching treatment. When the pulverization is conducted, it is preferable to use a medium such as a ball mill.

Furthermore, in order to promote the leaching, the acid may be used as heated, and a shaking operation or ultrasonic irradiation may be used in combination.

Although some of the crystals of the Zr.Ce.RE oxide solid solution might be dissolved by this leaching treatment, it is rather preferable from the viewpoint of uniformizing the particle sizes. The leaching treatment may be conducted once, or repeated multiple times.

After the leaching treatment, washing with pure water is conducted, if necessary, to obtain the fine particles of the Zr.Ce.RE oxide solid solution.

The fine particles of the Zr.Ce.RE oxide solid solution obtained by the present invention are preferably fine particles of a solid solution which comprises ceria as a main component and in which zirconium and a rare earth element are dissolved in the ceria or fine particles of a solid solution which comprises zirconia as a main component and in which cerium and a rare earth element are dissolved in the zirconia in view of high catalytic activity, excellent heat resistance and a high specific surface area.

It is noted that the term "main component" herein means that the content of the aforementioned oxide (ceria or zirconia) is the largest to the total of $ZrO_2$, $CeO_2$ and $RE_2O_3$ in the chemical composition of the fine particles of the Zr.Ce.RE oxide solid solution.

In the present invention, the fine particles of the Zr.Ce.RE oxide solid solution are those wherein the content of $ZrO_2$ in the chemical composition of the fine particles is preferably from 3 to 97 mol %, more preferably from 5 to 95 mol % to the total of $ZrO_2$, $CeO_2$ and $RE_2O_3$. When the content is within the above range, the fine particles are obtained with high catalytic activity and excellent heat resistance.

The fine particles of the Zr.Ce.RE oxide solid solution are those wherein the content of $CeO_2$ in the chemical composition of the fine particles is preferably from 3 to 97 mol %, more preferably from 5 to 95 mol % to the total of $ZrO_2$, $CeO_2$ and $RE_2O_3$. When the content is within the above range, the fine particles are obtained with high specific surface area and high catalytic activity.

Furthermore, the fine particles of the Zr.Ce.RE oxide solid solution are those wherein the content of $RE_2O_3$ in the chemical composition of the fine particles is preferably from 0.110 15 mol %, more preferably from 0.5 to 7.5 mol % to the total of $ZrO_2$, $CeO_2$ and $RE_2O_3$. When the content is within the above range, the fine particles are obtained with high specific surface area and excellent heat resistance, and they are particularly preferably used as an oxidation-reduction catalyst or as a co-catalyst of a three-way catalyst for treatment of automobile exhaust gas. On the other hand, when the content is less than 0.1 mol %, the heat resistance is not sufficient; when the content exceeds 15 mol %, an oxygen storage capacity might be decreased. Particularly, the content of $RE_2O_3$ is preferably in a range of from 0.5 to 7.5 mol % because the specific surface area becomes high and both the heat resistance and oxygen storage ability are developed enough.

Each of the contents in the chemical composition of the fine particles of the ZrCe RE oxide solid solution can be calculated, for example, by adding an HF—HNO$_3$—H$_2$O$_2$ solution mixture to the obtained fine particles of the Zr.Ce.RE oxide solid solution to decompose them into a solution and by measuring the contents of Zr, Ce and RE with an ICP (inductively-coupled high-frequency plasma) emission spectrometer.

Each content can be controlled mainly by the heating time and the heating temperature in the crystallizing step. For example, the higher the heating temperature, the higher the ZrO$_2$ content. On the other hand, the longer the heating time, the higher the ZrO$_2$ content.

An average primary particle size (a major axis in a case of anisotropic particles) of the fine particles of the Zr.Ce.RE oxide solid solution obtained in the present invention is preferably as small as possible. The smaller the average primary particle size, the higher the specific surface area of the fine particles tends to become, and the higher the specific surface area, the more the catalytic activity becomes improved. In particular, the average primary particle size of the fine particles is preferably from 5 to 200 nm, more preferably from 10 to 50 nm because the resulting fine particles have excellent heat resistance and a high specific surface area.

Furthermore, the specific surface area of the fine particles of the Zr.Ce.RE oxide solid solution obtained by the present invention is preferably at least 20 m$^2$/g, more preferably at least 30 m$^2$/g because the catalytic activity can be high.

The average primary particle size of the fine particles of the Zr.Ce.RE oxide solid solution is a value measured by X-ray diffraction. Furthermore, the specific surface area is a value obtained by converting a value measured by a nitrogen adsorption method, to a sphere by a BET method.

The average primary particle size and the specific surface area of the fine particles of the Zr.Ce.RE oxide solid solution can be controlled mainly by the average thickness or the average diameter of the amorphous material obtained in the quenching step and by the heating time and the heating temperature in the crystallizing step.

EXAMPLES

Now, the present invention will be explained with reference to examples, but it should be understood that the present invention is by no means construed as restricted to these examples.

Examples 1 to 22

Each of zirconium oxide (ZrO$_2$), cerium oxide (CeO$_2$), RE$_2$O$_3$ shown in Table 1 (La$_2$O$_3$, Gd$_2$O$_3$, Yb$_2$O$_3$, Y$_2$O$_3$, Pr$_2$O$_3$ or Nd$_2$O$_3$), RCO$_3$ shown in Table 1 (SrO and/or BaO) and boron oxide (B$_2$O$_3$) was weighed so that a melt had a composition in mol % based on oxides (ZrO$_2$, CeO$_2$, RE$_2$O$_3$, RO and B$_2$O$_3$), as shown in Table 1, and they were mixed and pulverized in a dry method to obtain a raw material mixture.

In the tables below, X (=ZrO$_2$+CeO$_2$+RE$_2$O$_3$) is a total content of ZrO$_2$, CeO$_2$ and RE$_2$O$_3$ and Z(=RO+B$_2$O$_3$) is a total content of RO and B$_2$O$_3$. Furthermore, ZrO$_2$/X, CeO$_2$/X and RE$_2$O$_3$/X are contents of CeO$_2$, ZrO$_2$ and RE$_2$O$_3$ to X, respectively, and RO/Z is a content of RO to Z.

TABLE 1

| | Chemical Composition of Melt (mol %) | | | | | | X[1] | ZrO$_2$/X[1] | CeO$_2$/X[1] | RE$_2$O$_3$/X[1] | RO/Z[2] |
|---|---|---|---|---|---|---|---|---|---|---|---|
| | | | | RO | | | | | | | |
| | ZrO$_2$ | CeO$_2$ | RE$_2$O$_3$ | SrO | BaO | B$_2$O$_3$ | (mol %) | (mol %) | (mol %) | (mol %) | (mol %) |
| Ex. 1 | 12.5 | 12.3 | La$_2$O$_3$ 0.15 | 12.5 | 12.5 | 50.0 | 25.0 | 50.0 | 49.4 | 0.6 | 33.3 |
| Ex. 2 | 12.5 | 12.2 | La$_2$O$_3$ 0.31 | 12.5 | 12.5 | 50.0 | 25.0 | 50.0 | 48.8 | 1.3 | 33.3 |
| Ex. 3 | 12.5 | 11.9 | La$_2$O$_3$ 0.63 | 12.5 | 12.5 | 50.0 | 25.0 | 50.0 | 47.5 | 2.5 | 33.3 |
| Ex. 4 | 12.5 | 11.6 | La$_2$O$_3$ 0.94 | 12.5 | 12.5 | 50.0 | 25.0 | 50.0 | 46.2 | 3.8 | 33.3 |
| Ex. 5 | 12.5 | 11.3 | La$_2$O$_3$ 1.25 | 12.5 | 12.5 | 50.0 | 25.0 | 50.0 | 45.0 | 5.0 | 33.3 |
| Ex. 6 | 11.3 | 12.5 | La$_2$O$_3$ 1.25 | 12.5 | 12.5 | 50.0 | 25.0 | 45.0 | 50.0 | 5.0 | 33.3 |
| Ex. 7 | 12.5 | 10.0 | La$_2$O$_3$ 2.50 | 12.5 | 12.5 | 50.0 | 25.0 | 50.0 | 40.0 | 10.0 | 33.3 |
| Ex. 8 | 10.0 | 12.5 | La$_2$O$_3$ 2.50 | 12.5 | 12.5 | 50.0 | 25.0 | 40.0 | 50.0 | 10.0 | 33.3 |
| Ex. 9 | 5.0 | 15.0 | La$_2$O$_3$ 5.00 | 12.5 | 12.5 | 50.0 | 25.0 | 20.0 | 60.0 | 20.0 | 33.3 |
| Ex. 10 | 10.0 | 10.0 | La$_2$O$_3$ 5.00 | 12.5 | 12.5 | 50.0 | 25.0 | 40.0 | 40.0 | 20.0 | 33.3 |
| Ex. 11 | 15.0 | 5.0 | La$_2$O$_3$ 5.00 | 12.5 | 12.5 | 50.0 | 25.0 | 60.0 | 20.0 | 20.0 | 33.3 |
| Ex. 12 | 10.0 | 10.0 | La$_2$O$_3$ 5.00 | 25.0 | 0.00 | 50.0 | 25.0 | 40.0 | 40.0 | 20.0 | 33.3 |
| Ex. 13 | 10.0 | 10.0 | La$_2$O$_3$ 5.00 | 0.00 | 25.0 | 50.0 | 25.0 | 40.0 | 40.0 | 20.0 | 33.3 |
| Ex. 14 | 13.3 | 13.3 | La$_2$O$_3$ 6.67 | 13.3 | 0.0 | 53.3 | 33.3 | 40.0 | 40.0 | 20.0 | 20.0 |
| Ex. 15 | 13.3 | 13.3 | La$_2$O$_3$ 6.67 | 6.67 | 6.67 | 53.3 | 33.3 | 40.0 | 40.0 | 20.0 | 20.0 |
| Ex. 16 | 13.3 | 13.3 | La$_2$O$_3$ 6.67 | 0.00 | 13.3 | 53.3 | 33.3 | 40.0 | 40.0 | 20.0 | 20.0 |
| Ex. 17 | 10.0 | 10.0 | Gd$_2$O$_3$ 5.00 | 12.5 | 12.5 | 50.0 | 25.0 | 40.0 | 40.0 | 20.0 | 33.3 |
| Ex. 18 | 10.0 | 10.0 | Yb$_2$O$_3$ 5.00 | 12.5 | 12.5 | 50.0 | 25.0 | 40.0 | 40.0 | 20.0 | 33.3 |
| Ex. 19 | 11.9 | 11.9 | Y$_2$O$_3$ 1.25 | 12.5 | 12.5 | 50.0 | 25.0 | 47.5 | 47.5 | 5.0 | 33.3 |
| Ex. 20 | 10.0 | 10.0 | Y$_2$O$_3$ 5.00 | 12.5 | 12.5 | 50.0 | 25.0 | 40.0 | 40.0 | 20.0 | 33.3 |
| Ex. 21 | 10.0 | 10.0 | Pr$_2$O$_3$ 5.00 | 12.5 | 12.5 | 50.0 | 25.0 | 40.0 | 40.0 | 20.0 | 33.3 |
| Ex. 22 | 10.0 | 10.0 | Nd$_2$O$_3$ 5.00 | 12.5 | 12.5 | 50.0 | 25.0 | 40.0 | 40.0 | 20.0 | 33.3 |

[1]X = ZrO$_2$ + CeO$_2$ + RE$_2$O$_3$
[2]Z = RO + B$_2$O$_3$

The raw material mixture obtained was filled in a crucible with a nozzle (made of platinum containing 20% by mass of rhodium) and heated at 1,500° C. in an electric furnace with a heating element made of molybdenum silicide for one hour to be completely melted.

Next, the melted glass material was dropped while heating the bottom end of the nozzle by the electric furnace, and droplets were made to pass between twin rollers with a diameter of about 15 cm rotating at 300 rpm so that the droplets were quenched at about 1×10$^5$° C./sec to obtain a solid material in the flake form. The flakes thus obtained showed a light yellow color or a brownish-red color and were a transparent amorphous material. Thicknesses of the flakes were measured with a micrometer and found to be from 30 to 50 μm.

A crystallization onset temperature was preliminarily measured by differential scanning calorimetry (DSC) using some of flakes obtained. Next, each flake was heated at 820° C. which was higher than all the crystallization onset temperatures of the flakes, for eight hours to precipitate crystals of a Z.Ce.RE oxide solid solution.

Then, the flakes after the crystallization treatment were shaken and stirred in a 1 mol/L solution of acetic acid at 70° C. for at least six hours to leach out soluble materials. A liquid after the leaching treatment was centrifuged and a supernatant was discarded. After this operation was repeated five times, washing with water was conducted five times, followed by drying to obtain fine particles.

The fine particles thus obtained were analyzed with an X-ray diffractometer. As a result, all diffraction peaks of the fine particles of Examples 1 to 20 agreed approximately with at least one diffraction peak of existing monoclinic $ZrO_2$ (JCPDS card No. 72-1669), tetragonal $ZrO_2$ (JCPDS card No. 50-1089), cubic $ZrO_2$ (JCPDS card No. 49-1642), $CeO_2$ (JCPDS card No. 43-1002) and the solid solution thereof. Here, the diffraction peaks of the fine particles of Examples 1 to 22 confirmed herein were mainly those attributed to the main components of the fine particles.

It is clear from these results that all the fine particles of Examples 1 to 22 had high crystallinity.

Furthermore, a liquid mixture of $HF-HNO_3-H_2O_2$ was added into some of the fine particles of the Zr.Ce.RE oxide solid solution obtained in Examples 10, 12, 13, 17, 18, 19, 20, 21 and 22 to decompose them into a solution and contents of Zr, Ce and RE were measured with an ICP emission spectrometer. Contents of $ZrO_2$ and $RE_2O_3$ (in mol %) to the total (X) of $ZrO_2$, $CeO_2$ and $RE_2O_3$ in the chemical composition of the fine particles were determined based on the contents of Zr, Ce and RE. Table 2 shows the results. It is clear from Table 2 that the fine particles of the Z.Ce.RE oxide solid solution were obtained in all the examples.

Next, an average primary particle size of the fine particles of Zr.Ce.RE oxide solid solution was obtained. It is noted that the average primary particle size herein is a particle size calculated based on the Scherrer's equation using a broadening of an X-ray diffraction peak. Table 2 shows the results. It is clear from Table 2 that all the fine particles obtained had very fine particle sizes.

Then a BET specific surface area of the above fine particles of Zr.Ce.RE oxide solid solution was obtained by a nitrogen multiple-point adsorption method. Table 2 shows the results. It is clear from Table 2 that all the fine particles obtained had high specific surface areas.

TABLE 2

| | Chemical Composition of Fine Particles of Solid Solution (mol %) | | Average Primary Particle Size | specific Surface |
|---|---|---|---|---|
| | $ZrO_2/X^{1)}$ | $RE_2O_3/X^{1)}$ | (nm) | Area (m²/g) |
| Ex. 10 | 70.9 | 0.51 ($La_2O_3$) | 27.3 | 57.4 |
| Ex. 12 | 75.1 | 0.57 ($La_2O_3$) | 19.8 | 59.3 |
| Ex. 13 | 65.5 | 0.43 ($La_2O_3$) | 39.4 | 39.3 |
| Ex. 17 | 70.3 | 1.34 ($Gd_2O_3$) | 36.2 | 21.5 |
| Ex. 18 | 86.5 | 2.55 ($Yb_2O_3$) | 33.8 | 36.2 |
| Ex. 19 | 79.1 | 1.10 ($Y_2O_3$) | 26.2 | 34.2 |
| Ex. 20 | 79.1 | 1.60 ($Y_2O_3$) | 28.5 | 36.2 |

TABLE 2-continued

| | Chemical Composition of Fine Particles of Solid Solution (mol %) | | Average Primary Particle Size | specific Surface |
|---|---|---|---|---|
| | $ZrO_2/X^{1)}$ | $RE_2O_3/X^{1)}$ | (nm) | Area (m²/g) |
| Ex. 21 | 85.6 | 0.60 ($Pr_2O_3$) | 21.0 | 46.0 |
| Ex. 22 | 85.5 | 0.71 ($Nd_2O_3$) | 18.1 | 51.0 |

$^{1)}X = ZrO_2 + CeO_2 + RE_2O_3$

Example 23

Comparative Example

Each of zirconium oxide ($ZrO_2$), cerium oxide ($CeO_2$), lanthanum oxide ($La_2O_3$), barium carbonate ($BaCO_3$) and boron oxide ($B_2O_3$) was weighed so that a melt had a composition of 1.0%, 0.9%, 0.1%, 38.0% and 60.0% in mol % based on $ZrO_2$, $CeO_2$, $La_2O_3$, BaO and $B_2O_3$, and they were mixed to obtain a raw material mixture.

The raw material mixture thus obtained was subjected to the mixing and pulverizing operation, melting operation, quenching operation, crystallizing operation and leaching operation in the same manner as in Examples 1 to 22. As a result, no fine particles of Ce.Zr.La oxide solid solution were visually confirmed.

Example 24 (Comparative Example)

Each of zirconium oxide ($ZrO_2$), cerium oxide ($CeO_2$), lanthanum oxide ($La_2O_3$), barium carbonate ($BaCO_3$) and boron oxide ($B_2O_3$) was weighed so that a melt had a composition of 30.0%, 20.0%, 5.0%, 25.0% and 25.0% in mol % based on $ZrO_2$, $CeO_2$, $La_2O_3$, BaO and $B_2O_3$, and they were mixed to obtain a raw material mixture.

The raw material mixture thus obtained was subjected to the mixing and pulverizing operation, and then to the melting operation in the same manner as in Examples 1 to 22, but the mixture was not completely melted, so as to obtain no amorphous material.

INDUSTRIAL APPLICABILITY

The present invention provides the fine particles of the solid solution having the small particle size, comprising the solid solution of zirconia, ceria and the rare earth oxide other than ceria in the desired composition, and being highly crystalline. Furthermore, because the fine particles have the high specific surface area, excellent heat resistance, and show insignificant change in the particle size in high-temperature use, they are suitably used, over a long period of time, as an oxidation-reduction catalyst, a co-catalyst of a three-way catalyst for treatment of exhaust gas discharged from automobiles, a material for fuel cells, and so on.

What is claimed is:

1. A process for producing fine particles of a solid solution, comprising:
   obtaining a melt comprising, in terms of mol % on an oxide basis, from 5 to 50% $ZrO_2$, $CeO_2$ and $RE_2O_3$ where RE is at least one member selected from rare earth elements other than Ce in total, from 10 to 50% RO where R is Zn and optionally at least one member selected from the group consisting of Mg, Ca, Sr and Ba, and from 30 to 75% $B_2O_3$;

quenching the melt to obtain an amorphous material;
heating the amorphous material to obtain precipitates comprising crystals of a solid solution comprising $ZrO_2$, $CeO_2$ and $RE_2O_3$; and
separating the crystals of the solid solution from the precipitates to obtain fine particles of the solid solution.

2. The process for producing the fine particles of the solid solution according to claim 1, wherein a content of $CeO_2$ in the melt is from 3 to 50 mol % to the total of $ZrO_2$, $CeO_2$ and $RE_2O_3$.

3. The process for producing the fine particles of the solid solution according to claim 1, wherein a content of $RE_2O_3$ in the melt is from 0.5 to 45 mol % to the total of $ZrO_2$, $CeO_2$ and $RE_2O_3$.

4. The process for producing the fine particles of the solid solution according to claim 1, wherein a content of RO in the melt is from 10 to 60 mol % to the total of RO and $B_2O_3$.

5. The process for producing the fine particles of the solid solution according to claim 1, wherein the amorphous material is of a flake form or a fiber form.

6. The process for producing the fine particles of the solid solution according to claim 1, wherein the amorphous material is heated at a temperature of from 600 to 900° C.

7. The process for producing the fine particles of the solid solution according to claim 1, wherein the crystals of the solid solution are separated by adding an acid into the precipitates.

8. The process for producing the fine particles of the solid solution according to claim 1, wherein a content of $ZrO_2$ in a chemical composition of the fine particles of the solid solution is from 3 to 97 mol % to the total of $ZrO_2$, $CeO_2$ and $RE_2O_3$.

9. The process for producing the fine particles of the solid solution according to claim 1, wherein a content of $CeO_2$ in a chemical composition of the fine particles of the solid solution is from 3 to 97 mol % to the total of $ZrO_2$, $CeO_2$ and $RE_2O_3$.

10. The process for producing the fine particles of the solid solution according to claim 1, wherein a content of $RE_2O_3$ in a chemical composition of the fine particles of the solid solution is from 0.1 to 15 mol % to the total of $ZrO_2$, $CeO_2$ and $RE_2O_3$.

11. The process for producing the fine particles of the solid solution according to claim 1, wherein an average primary particle size of the fine particles of the solid solution is from 5 to 200 nm.

12. The process for producing the fine particles of the solid solution according to claim 1, wherein a specific surface area of the fine particles of the solid solution is at least 20 $m^2/g$.

13. The process for producing the fine particles of the solid solution according to claim 1, comprising obtaining the melt at a temperature of 1200° C. or above.

14. The process for producing the fine particles of the solid solution according to claim 1, wherein the RE metal element other than Ce is one of Sc, Y, La, Pr, Nd, Pm, Sm, Eu, Gd, Tb, Dy, Ho, Er, Tm, Yb and Lu.

15. The process for producing the fine particles of the solid solution according to claim 1, wherein the RE metal element other than Ce is one of La, Pr, Nd, Y, Gd and Yb.

16. The process for producing the fine particles of the solid solution according to claim 1, wherein the content of $ZrO_2$ in the melt is higher than 40 mol % and less than 60 mol % in the total of $ZrO_2$, $CeO_2$ and $RE_2O_3$.

17. The process for producing the fine particles of the solid solution according to claim 1, wherein the content of $ZrO_2$ in the melt is from 3 to 95 mol % in the total of $ZrO_2$, $CeO_2$ and $RE_2O_3$.

* * * * *